Jan. 7, 1941.     G. W. MILES     2,227,456
OVEN
Filed Nov. 16, 1939     4 Sheets-Sheet 1
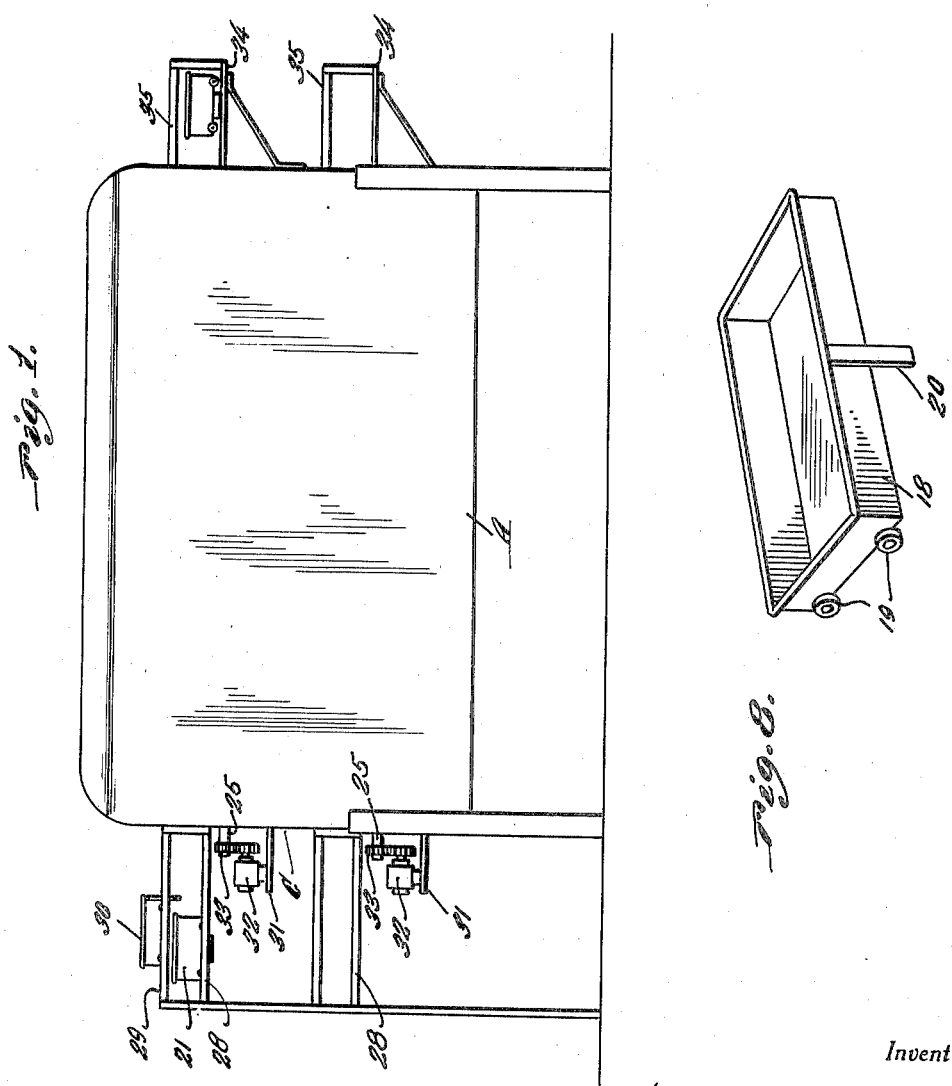
Inventor
G. W. Miles
By Clarence A. O'Brien
and Hyman Berman
Attorneys

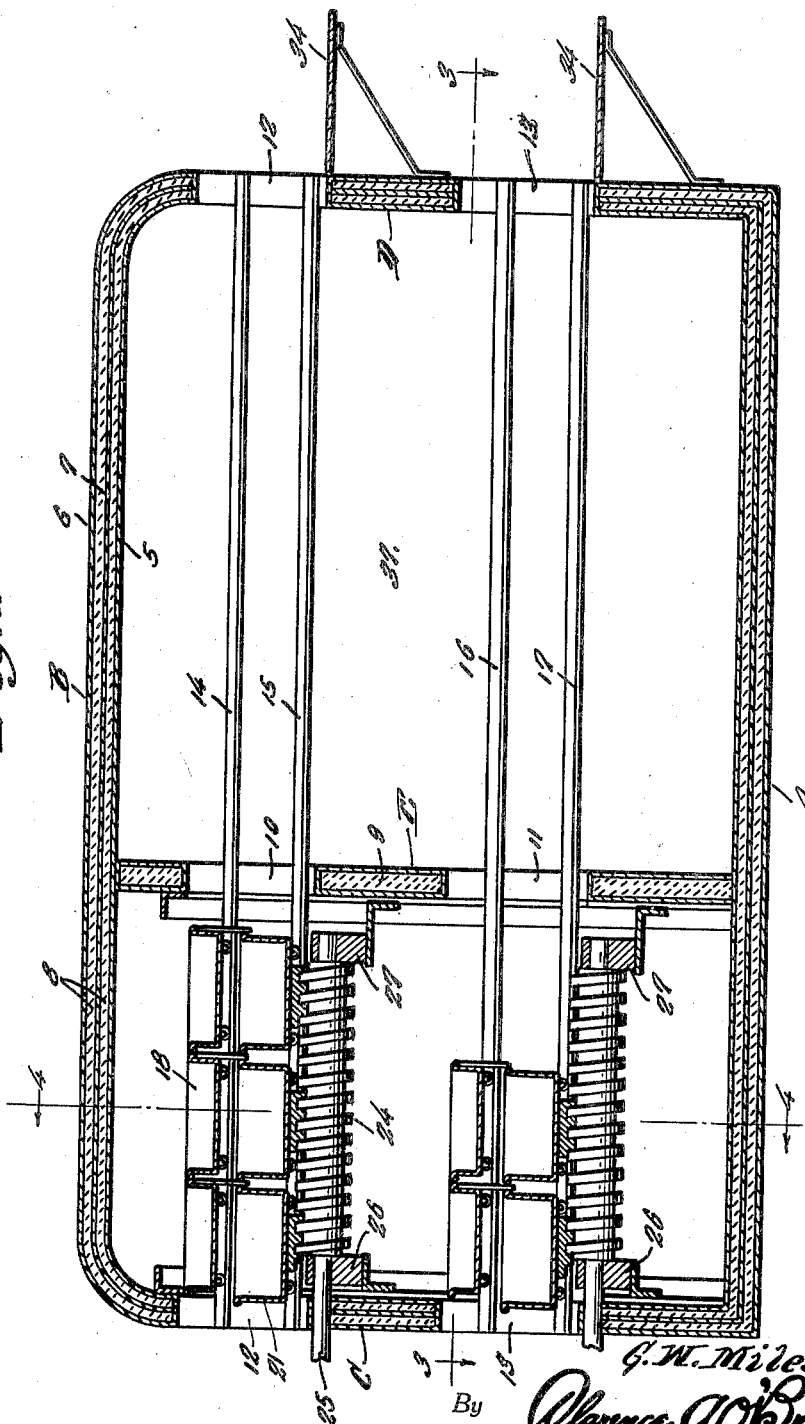

Jan. 7, 1941.   G. W. MILES   2,227,456
OVEN
Filed Nov. 16, 1939   4 Sheets-Sheet 3
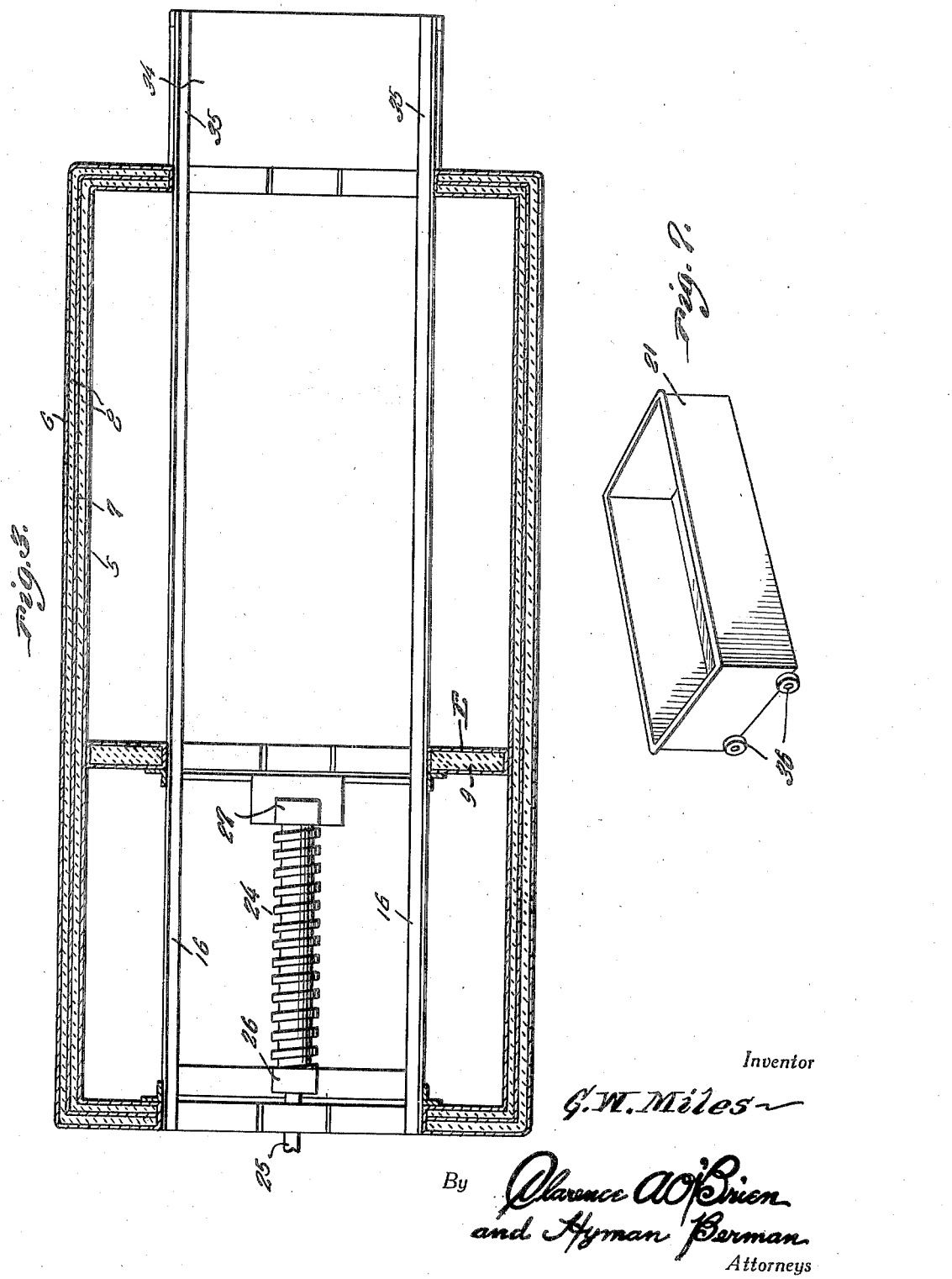
Inventor
G. W. Miles
By Clarence A. O'Brien
and Hyman Berman
Attorneys

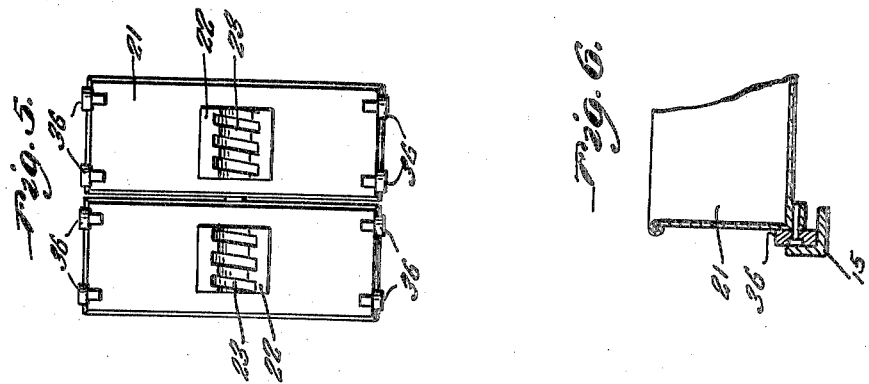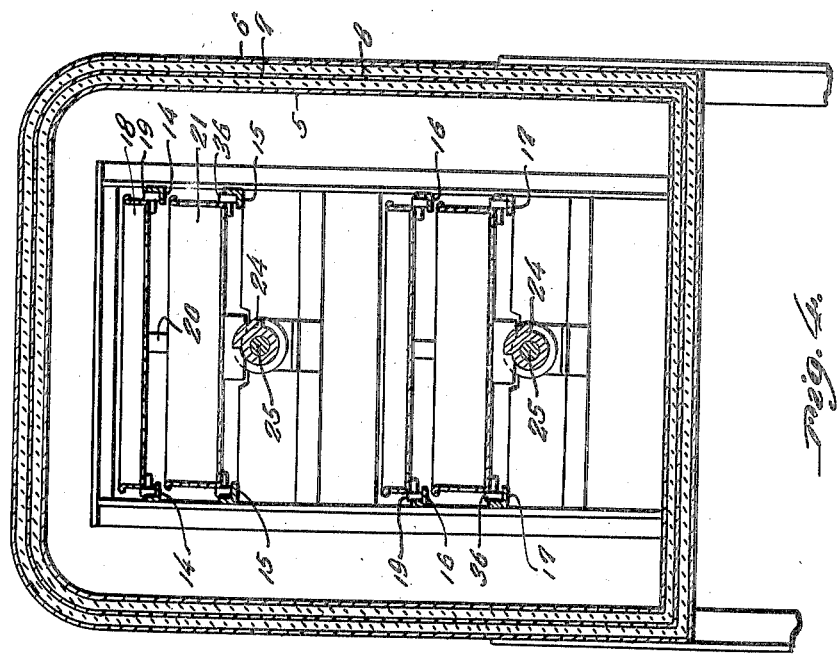

Patented Jan. 7, 1941

2,227,456

UNITED STATES PATENT OFFICE 2,227,456

OVEN

Grant W. Miles, Lansing, Mich.

Application November 16, 1939, Serial No. 304,868

5 Claims. (Cl. 107—56)

This invention appertains to new and useful improvements in ovens and more particularly to ovens of the commercial type.

The principal object of the present invention is to provide an oven into which and out of which food stuffs to be baked can be moved in a convenient and safe manner.

Another important object of the invention is to provide an oven wherein foodstuffs can be cooked simultaneously from the standpoint of "light baking" and "heavy baking."

These and various other important objects and advantages of the invention will become apparent to the reader of the following specification.

In the drawings:

Figure 1 represents a side elevational view of the oven.

Figure 2 is a longitudinal sectional view.

Figure 3 is a horizontal sectional view taken substantially on the line 3—3 of Figure 2.

Figure 4 is a cross sectional view on the line 4—4 of Figure 2.

Figure 5 is a bottom plan view of two of the large bake pans.

Figure 6 is a fragmentary detailed sectional view through one of the track members and a bake pan.

Figure 7 is a perspective view of one of the heavy service bake pans.

Figure 8 is a perspective view of one of the light service bake pans.

Referring to the drawings wherein like numerals designate like parts, it can be seen that the oven consists of the bottom wall A, the top wall B and the front and rear walls C and D. Each of these walls is made up of the inner shell 5, the outer shell 6 and the intermediate shell 7, and between these shells are the two plies of heat insulation 8.

A partition E is vertically disposed in the oven and has the filler 9 of insulation. This partition E has the upper traffic opening 10 and the lower traffic opening 11. The end walls C and D have the upper and lower openings 12 and 13 corresponding to the openings 10 and 11 of the partition E. Through the upper openings 12, 10 and 12 are disposed the upper and lower angle iron rails 14 and 15, respectively, while the upper and lower track rails 16 and 17 are disposed through the lower openings 13, 11 and 13.

The upper rails 14 take care of the light bake pans 18. These bake pans are shallow and have the rollers 19 at the ends thereof, these rollers riding on the upper track rails 14 and 16. Each of these shallow light duty bake pans 18 has a depending leg 20 which abuts an edge portion of an underlying heavy duty bake pan 21. These bake pans 21 are of deeper depth and function to move the light pans 18 along with themselves. These heavy duty pans 21 each has a block 22 at its bottom side formed with grid impressions 23 which are cooperative with the screw 24 carried by the shaft 25. There is one of these shafts 24 underlying the rails 15 and also the rails 17 as there are two traffics or lanes of the pans 18—21. (See Figure 2).

The shafts 25 are journaled through bearings 26—27. As shown in Figure 1, at the entrance of each of the openings 12 and 13 is a suitable platform or table 28 for the heavy duty pans 21 while overlying tables or track structures 29 serve to carry the light baking pans 30. Bracket 31 on the wall C serves to support motors 32 which are geared as at 33 to the shafts 25.

Of course, it is possible to gear these shafts 25 together and have only one power source.

The openings 12 and 13 at the rear wall D have a platform 34 for each of the trackways 15 and 17 and over these platforms 34 are located the trackways 35 for handling the light duty trays 30 as they emerge from the oven.

As is apparent in Figure 7 and also in Figure 5, the heavy duty pans 21 are also provided with rollers 36 at their ends.

The chamber 37 allows circulation of hot air and obviously burners can be suitably arranged in the oven so that heat is applied to the pans in a desired manner.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An oven comprising a heat chamber, a trackway extending through the heat chamber and a plurality of bake pans having rollers and adapted to ride on the trackway, and means for feeding the pans one against the other through the passageway on the said trackway, said means consisting of grid impressed blocks on the bottoms of the pans, and a screw shaft with which the blocks mesh.

2. An oven comprising a heat chamber, a trackway extending through the heat chamber and a plurality of bake pans having rollers and adapted to ride on the trackway, and supplemental light duty pans adapted to be moved by the travel first-mentioned pans.

3. An oven comprising a heat chamber, a trackway extending through the heat chamber and a plurality of bake pans having rollers and adapted to ride on the trackway, and supplemental light duty pans adapted to be moved by the travel first-mentioned pans, and a trackway for the light duty pans.

4. An oven comprising a heat chamber, a trackway extending through the heat chamber and a plurality of bake pans having rollers and adapted to ride on the trackway, and supplemental light duty pans adapted to be moved by the travel first-mentioned pans, and a trackway for the light duty pans, each of the said light duty pans having a depending leg for operating engagement with the underlying first-mentioned pan.

5. An oven comprising a heat chamber, a trackway extending through the heat chamber and a plurality of bake pans having rollers, said bake pans being adapted to ride on the trackway, and means for feeding the pans while in abutting relation through the passageway on the said trackway, said means consisting of a rib-formed block on the bottom of each of the pans, and a short screw mounted for rotation at one end of the trackway and with which the ribs of the blocks mesh, certain pans having their ribbed blocks meshing with the screw shaft being adapted to push the rest of the pans which have left the screw.

GRANT W. MILES.